(12) United States Patent
Inaba

(10) Patent No.: US 8,367,029 B2
(45) Date of Patent: Feb. 5, 2013

(54) METHOD FOR PRODUCING TRICHLOROSILANE

(75) Inventor: Chikara Inaba, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 434 days.

(21) Appl. No.: 12/591,429

(22) Filed: Nov. 19, 2009

(65) Prior Publication Data

US 2010/0074823 A1 Mar. 25, 2010

Related U.S. Application Data

(62) Division of application No. 12/289,001, filed on Oct. 17, 2008, now Pat. No. 7,641,872.

(30) Foreign Application Priority Data

Oct. 23, 2007 (JP) .................................. 2007-275625
Jul. 18, 2008 (JP) .................................. 2008-187500

(51) Int. Cl.
*C01B 33/08* (2006.01)

(52) U.S. Cl. ...................................... 423/342; 423/324

(58) Field of Classification Search .................. 423/324, 423/341, 342; 422/232
See application file for complete search history.

(56) References Cited

U.S. PATENT DOCUMENTS

| 4,044,109 A | 8/1977 | Kotzsch et al. |
| 4,176,710 A | 12/1979 | Gansauge et al. |
| 4,424,198 A | 1/1984 | Ito et al. |
| 5,063,040 A | 11/1991 | Ruff |

FOREIGN PATENT DOCUMENTS

| CN | 101125654 | 2/2008 |
| EP | 0684070 | 11/1995 |
| EP | 0776692 | 6/1997 |
| JP | 08-059221 | 3/1996 |
| SU | 1579556 A1 | 7/1990 |

OTHER PUBLICATIONS

European Search Report dated Jan. 30, 2009, issued on the corresponding European application No. 08 16 6613.3.
Russian Office Action mailed Jul. 5, 2012, issued for Russian Patent Application No. 2008141675 and English translation thereof.

*Primary Examiner* — Edward Johnson
(74) *Attorney, Agent, or Firm* — Edwards Wildman Palmer LLP

(57) ABSTRACT

In the apparatus for producing trichlorosilane in which metal silicon powder supplied into the reactor is reacted with hydrogen chloride gas while being fluidized by the gas, thereby taking out trichlorosilane generated by the reaction from the upper part of the reactor, and a plurality of gas flow controlling members are installed at the internal space of the reactor along the vertical direction.

10 Claims, 4 Drawing Sheets

METHOD FOR PRODUCING TRICHLOROSILANE

This application is a divisional application of U.S. application Ser. No. 12/289,001 filed Oct. 17, 2008, and claims the right of priority under 35 U.S.C. §119 based on Japanese Patent Application Nos. 2007-275625 filed Oct. 23, 2007 and 2008-187500 filed Jul. 18, 2008, which is hereby incorporated by reference herein in its entirety as if fully set forth herein.

CROSS-REFERENCE TO RELATED APPLICATIONS

Priority is claimed on Japanese Patent Application No. 2007-275625, filed Oct. 23, 2007, and Japanese Patent Application No. 2008-187500, filed Jul. 18, 2008, the content of which is incorporated herein by reference.

BACKGROUND OF THE INVENTION

1. Field of the Invention

The present invention relates to an apparatus and method for producing trichlorosilane in which metal silicon powder is reacted with hydrogen chloride gas while being fluidized by the hydrogen chloride gas, thereby producing trichlorosilane.

2. Description of Related Art

Trichlorosilane ($SiHCl_3$) used as a raw material for producing high purity silicon is produced by reacting metal silicon powder (Si) of about 98% in purity with hydrogen chloride gas (HCl).

The apparatus for producing trichlorosilane is, for example as disclosed in Japanese Published Unexamined Patent Application, First Publication No. H08-59221, provided with a reactor, a raw material supply device for supplying metal silicon powder to the bottom of the reactor, and gas introduction device for introducing hydrogen chloride gas with which metal silicon powder is reacted. In the apparatus for producing trichlorosilane, the metal silicon powder inside the reactor is reacted with hydrogen chloride gas while being fluidized with the hydrogen chloride gas, thereby taking out the generated trichlorosilane from the upper part of the reactor. A heat transfer tube which flows a heating medium along the vertical direction is provided inside the reactor.

Incidentally, metal silicon powder is fluidized at the inner bottom of the reactor by ascending hydrogen chloride gas which is introduced from therebelow, and the metal silicon powder is contacted with the hydrogen chloride gas to cause a reaction during fluidization. In this embodiment, the hydrogen chloride gas ascends like bubbles from the lower part to the upper part in the fluidized bed of the metal silicon powder. However, in the meantime, the bubbles grow greater at the upper part of the reactor than at the lower part thereof. When the bubbles of hydrogen chloride gas grow greater, there is a decrease in the contact area with the metal silicon powder, resulting in a tendency of lower efficiency of the reaction takes place particularly at the upper part of the reactor.

The present invention has been made in view of the above situation, an object of which is to provide an apparatus and method for producing trichlorosilane in which hydrogen chloride gas introduced from the lower part of the reactor is made an effective contribution even at the upper part of the reactor, thereby attaining a higher reaction efficiency.

SUMMARY OF THE INVENTION

The apparatus for producing trichlorosilane of the present invention is an apparatus for producing trichlorosilane in which metal silicon powder supplied to a reactor is reacted with hydrogen chloride gas while being fluidized by the hydrogen chloride gas and trichlorosilane generated by this reaction is taken out from the upper part of the reactor. A plurality of gas flow controlling members is disposed at an internal space of the reactor along the vertical direction.

In the apparatus for producing trichlorosilane of the present invention, hydrogen chloride gas introduced to the reactor ascends through a space between gas flow controlling members, and contacts with gas flow controlling members which are adjacent and in close proximity, by which growth of bubbles is suppressed. Therefore, a great number of relatively fine bubbles remain even at the upper part of the reactor. Accordingly, there is an increase in contact area between hydrogen chloride and metal silicon powder to improve the reaction efficiency.

In the apparatus for producing trichlorosilane of the present invention, a large diameter portion greater in inner diameter than the lower part of the reactor is formed at the upper part thereof, and the height of the upper end of the gas flow controlling member may be higher than that of the lower end of the large diameter portion.

Inside the reactor, the reaction takes place most extensively at the lower part thereof to be higher in temperature. Further, since hydrogen chloride gas also ascends from therebelow, convection takes place in a fluidized bed where currents ascend in the vicinity of the center in the radial direction while they descend in the vicinity of the inner peripheral wall of the reactor. Then, trichlorosilane gas is discharged from the upper end of the reactor. It is, however, necessary to prevent metal silicon powder, a composition of the fluidized bed, from being discharged to the utmost from a discharge port of the trichlorosilane gas. A large diameter portion is disposed at the upper part of the reactor, by which upward flow are decreased in speed in the fluidized bed at the part concerned and the metal silicon powder ascending together with the upward flow is freely fallen into the downward flow. In this embodiment, gas flow controlling members may be arranged so that the upper end is equal in height to the lower end of the large diameter portion or may be kept low to such an extent that they will not reach the large diameter portion. The inner diameter of the large diameter portion is preferably in a range from about 1.3 to 1.6 times with respect to the inner diameter of the lower part of the reactor.

It is preferable that the lower end of the gas flow controlling member is formed to have a convex (pointed, acute, cone shape, tapered) face protruding downward. Thereby, it is possible to smoothly guide upward flow from therebelow by the convex face and also to reduce damage of the gas flow controlling members resulting from collision of metal silicon powder in the upward flow. A sintered hard alloy or the like may be used to give a wear-resistant coating to the convex face. The convex face may be formed in a circular arc face and a hemisphere face, in addition to in a conical face.

In this embodiment, where the gas flow controlling member is of a hollow structure, the gas flow controlling member can be made lighter in weight.

Then, in the method for producing trichlorosilane of the present invention, a plurality of gas flow controlling members are disposed at the internal space of a reactor along the vertical direction, metal silicon powder is supplied to the reactor, hydrogen chloride gas is ejected from therebelow, then, the metal silicon powder is reacted with the hydrogen chloride gas while being fluidized with the hydrogen chloride gas between the gas flow controlling members, taking out trichlorosilane generated by the reaction from the upper part of the reactor.

According to the present invention, when metal silicon powder and hydrogen chloride gas ascend, passing through a group of gas flow controlling members, they are brought into contact with the gas flow controlling members, by which growth of bubbles of the hydrogen chloride gas is suppressed to reserve relatively fine bubbles at the upper part of the reactor. Consequently, it is possible to increase a contact area between hydrogen chloride and the metal silicon powder and also improve the reaction efficiency.

DESCRIPTION OF THE PREFERRED EMBODIMENTS

Figure 1:
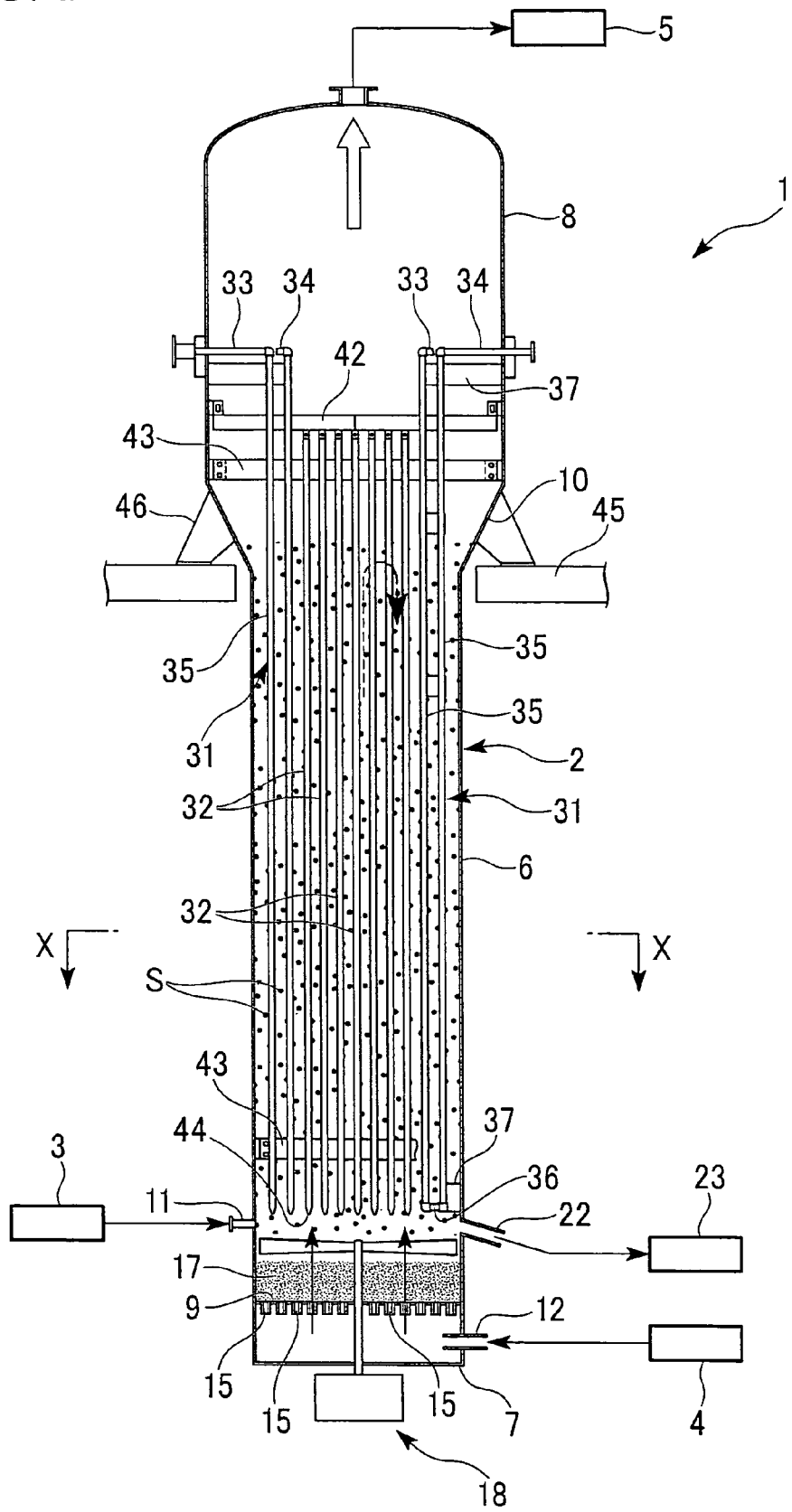
FIG. 1 is a longitudinal sectional view showing one embodiment of the apparatus for producing trichlorosilane of the present invention.

Hereinafter, an explanation will be made of one embodiment of the present invention by referring to the drawings.

The apparatus 1 for producing trichlorosilane is provided with a reactor 2, raw material supply device 3 for supplying metal silicon powder as a raw material to the reactor 2, gas introduction device 4 for introducing hydrogen chloride gas which reacts with the metal silicon powder, and gas removal device 5 for discharging the generated trichlorosilane gas.

The reactor 2 is provided with a body 6 formed substantially in a straight cylindrical shape along the vertical direction, a bottom 7 connected to the lower end of the body 6, and a cylindrical large diameter portion 8 connected coaxially to the upper end of the body 6. In this embodiment, the body 6 is formed substantially similar in diameter to the bottom 7 and the space between them is partitioned by a horizontal partition wall 9. On the other hand, a cone shaped tapered portion 10 increasing in diameter upward is formed at the upper part of the body 6, and the large diameter portion 8 is integrally connected to the upper end of the tapered portion 10. Thus, the internal space of the body 6 is communicatively connected to that of the large diameter portion 8. In this embodiment, the inner diameter of the large diameter portion 8 is set to be 1.3 to 1.6 times greater than the inner diameter of the body 6.

The raw material supply device 3 supplies metal silicon powder from a raw material feed hopper (not illustrated) via a raw material supply tube 11 connected to the lower part of the body 6 of the reactor 2. The metal silicon powder is supplied to the reactor 2 by using hydrogen chloride gas as a carrier gas.

On the other hand, the gas introduction device 4 introduces hydrogen chloride gas into the bottom 7 of the reactor 2 via a gas supply tube 12.

A plurality nozzle 15 is fixed along the vertical direction so as to penetrate a partition wall 9 which partitions the bottom 7 of the reactor 2 from the body 6. The upper end openings of the nozzles 15 are arranged inside the body 6 and the lower end opening is arranged inside the bottom 7. Then, hydrogen chloride gas introduced by the gas introduction device 4 into the bottom 7 of the reactor 2 is ejected into the body 6, with the gas dispersed into each of the nozzles 15.

Further, dispersing materials 17 formed in a ball shape or the like are laid densely on the partition wall 9, and an agitator 18 is installed so as to provide agitation above the layer of the dispersing materials 17.

The agitator 18 has a horizontal rotor blade and a motor for rotating the rotor blade, and agitates the material silicon powder.

Metal silicon powder, or a raw material, fed from the raw material supply tube 11 of the raw material supply device 3 is mixed with hydrogen chloride gas ascending from below, by which the metal silicon powder ascends toward the upper part of the reactor 2, together with upward flow. Unreacted metal silicon powder is taken out from an unreacted raw-material discharge tube 22 and sent to an unreacted raw-material processing system 23 after the reactor 2 is halted.

Figure 2:
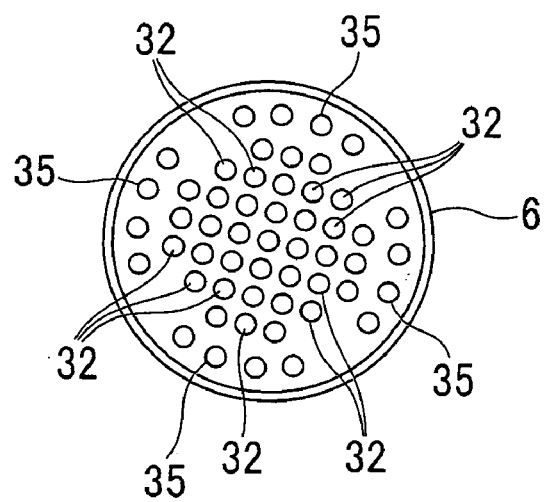
FIG. 2 is a sagittal enlarged sectional view taken along line X to X in FIG. 1.

On the other hand, a plurality of heat transfer tubes 31 through which a heating medium passes and a plurality of gas flow controlling members 32 are installed inside an internal space from the body 6 to the large diameter portion 8. A plurality of the heat transfer tubes 31 are installed circumferentially at certain intervals in an annular space near the inner peripheral wall in the internal space of the body 6. As shown in FIG. 1 and FIG. 2, each heat transfer tube 31 consists of two parallel longitudinal tubes 35 running along the vertical direction and a horizontal joint tube 36 connecting the lower ends of the longitudinal tubes 35. The both upper ends of heat transfer tube 31 are connected between an inlet tube 33 and an outlet tube 34 penetrating through a side wall of the large diameter portion 8 so that heat medium flows through the heat transfer tube 31 to provide reciprocating flow. Further the longitudinal tube 35 of the heat transfer tube 31 is fixed to the inner peripheral wall of the body 6 at plural points midway from the length direction by using ribs 37 for preventing the swinging.

A plurality of gas flow controlling members 32 are installed along the vertical direction in a central space enclosed with the heat transfer tubes 31. The gas flow controlling member 32 is formed by closing both ends of an internally hollow tube 41, the cross section of which is, for example, circular, and the upper end thereof is suspended by a beam member 42 constructed inside the large diameter portion 8, and the upper end portion and the lower end portion are supported respectively on the large diameter portion 8 and the inner peripheral wall of the body by guide members 43. In this embodiment, each of the gas flow controlling members 32 is formed so as to be shorter than the heat transfer tube 31, and the lower end of the gas flow controlling members 32 is installed so as to be equal in height to the lower end of the heat transfer tube 31. However, the upper end of the gas flow controlling members 32 is arranged below from the upper end of the heat transfer tube 31. The gas flow controlling members 32 arranged from the lower end part of the large diameter portion 8 of the reactor 2 to the lower part of the body 6.

Figure 3:
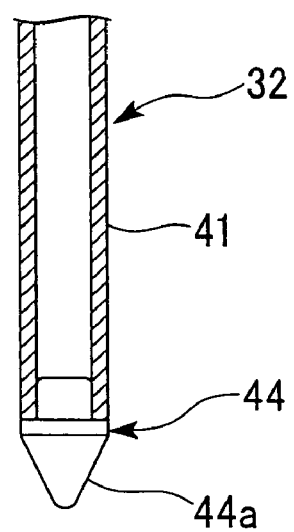
FIG. 3 is an enlarged sectional view of the lower end of the gas flow controlling member in FIG. 1.

Further, as shown in FIG. 3, a leading end member 44 projecting in a cone shape is fixed to the lower end of the gas flow controlling member 32, and a cone-shaped convex face 44a is arranged, with the face turned downward.

It is noted that a tapered portion 10 of the upper part of the body 6 is fixed to a floor 45 by a bracket 46, by which the reactor 2 is supported so as to be suspended from the bracket 46.

An explanation will be made for a method for producing trichlorosilane by using the apparatus 1 for producing trichlorosilane.

Metal silicon powder is supplied into the reactor 2 by gas transportation through a raw material supply tube 11. In this embodiment, hydrogen chloride gas is used as a carrier gas for gas transportation, and the supply quantity of the material silicon powder is adjusted by controlling the carrier gas flow rate.

Further, the gas introduction device 4 is used to introduce hydrogen chloride gas into the bottom 7 of the reactor 2. The hydrogen chloride gas is ejected into the body 6 via nozzles 15 installed so as to be communicatively connected between the bottom 7 of the reactor 2 and the body 6 thereof as shown by the solid line arrows in FIG. 1, and metal silicon powder S supplied to the upper position thereof is made to ascend, while being fluidized, together with upward flow of hydrogen chloride gas from below.

A fluidized mixture of the metal silicon powder S with hydrogen chloride gas ascends through a group of heat transfer tubes 31 and gas flow controlling members 32 in the body 6 of the reactor 2. The fluidized mixture contains bubbles of hydrogen chloride gas, and these bubbles have tendency to gradually grow greater as they ascend upward. However, in this embodiment, when the bubbles ascend through the aggregate of the heat transfer tubes 31 (longitudinal tubes 35) and the gas flow controlling members 32, the growing bubbles collide against the heat transfer tubes 31 or the gas flow controlling members 32 standing close together, and the bubbles break in smaller bubbles.

Figure 4:
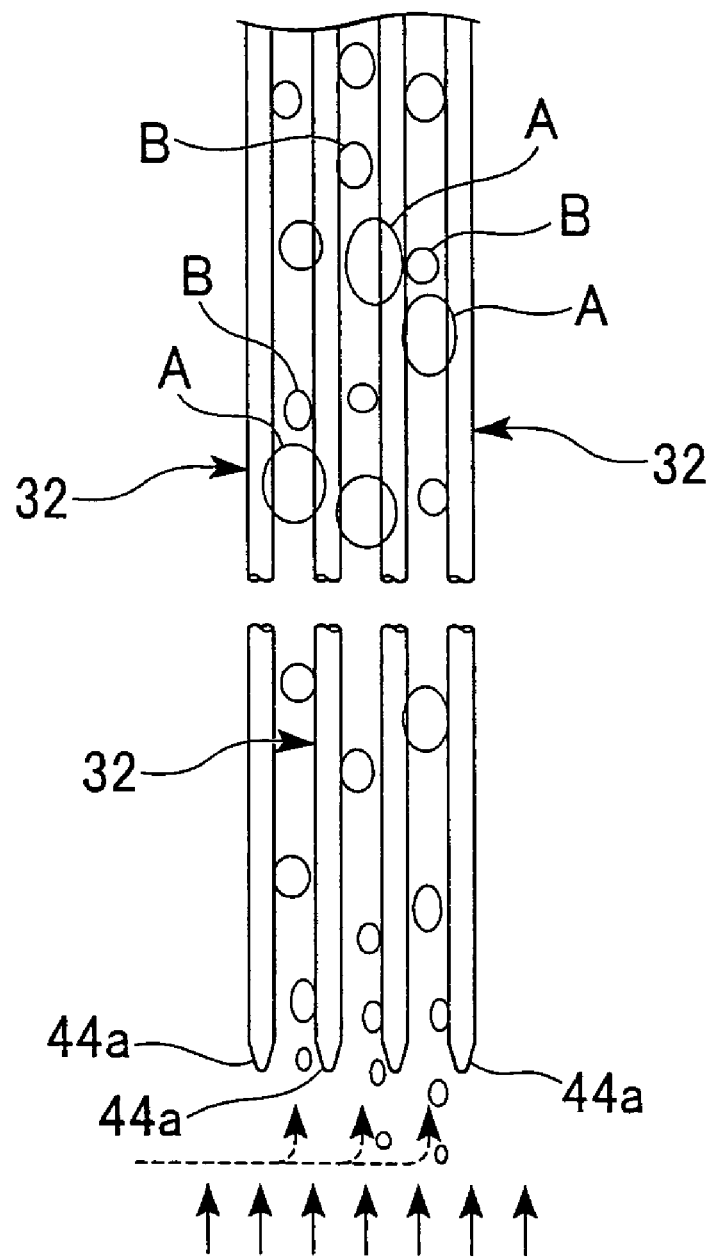
FIG. 4 is a pattern diagram for explaining the function of the gas flow controlling member in one embodiment.

The above matter will be explained by referring to the pattern diagram of FIG. 4. Metal silicon powder supplied as shown by the broken line arrows in FIG. 4 is mixed with hydrogen chloride gas shown by the solid line arrows to be fluidized and both of them are made to ascend together. Bubbles A of hydrogen chloride gas which grow greater according to the ascent are brought into contact with the longitudinal tubes 35 of the heat transfer tubes 31 and the gas flow controlling members 32. Since the longitudinal tubes 35 and the gas flow controlling members 32 are arranged so as to be in close proximity to each other, the bubbles A burst between the longitudinal tubes 35 and the gas flow controlling members 32 or the longitudinal tubes 35 and the longitudinal tubes 35 as well as the gas flow controlling members 32 and the gas flow controlling members 32 and ascend after they are broken down into bubbles B relatively small in diameter.

In particular, many gas flow controlling members 32 are arranged at a central space of the reactor 2, by which hydrogen chloride gas introduced from the bottom 7 of the reactor 2 ascends up to the upper part of the reactor 2, with bubbles kept relatively small in diameter, and in the meantime, the gas is in contact with metal silicon powder to react with metal silicon powder, thereby generating trichlorosilane. Then, a contact area with the metal silicon powder is increased due to the smaller diameter bubbles, thereby improving the reaction efficiency.

Then, trichlorosilane gas ascended to the upper part of the body 6 of the reactor 2 is discharged from the top of the reactor 2 into the gas removal device 5 as shown in the outline arrow in FIG. 1. Because the inner diameter of the reactor 2 gradually becomes greater from the lower end of the tapered portion 10 to the large diameter portion 8, the pressure of the hydrogen chloride in the fluidized mixture decreases, and the velocity of metal silicon powder gradually decreases as it ascends in the tapered portion 10. Therefore, unreacted metal silicon powder S is fallen down in the vicinity of the tapered portion 10 due to its own weight as shown by the broken line arrow. Thereby, the metal silicon powder S can be separated to result in an efficient discharge of trichlorosilane gas alone.

The present invention shall not be limited to the above embodiment but may be modified in various ways within a scope not departing from the gist of the invention. For example, the heat transfer tube and the gas flow controlling member may be changed appropriately in number, length or others, depending on the size of the reactor.

Figure 5A:
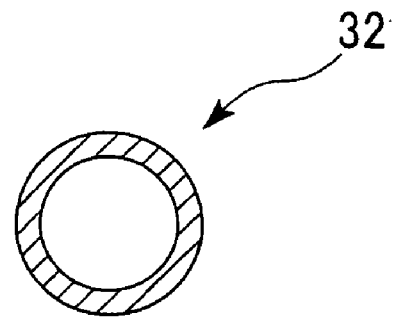
FIG. 5 is a sectional view showing a plurality of examples of the gas flow controlling member, when viewed transversely.
Figure 5B:
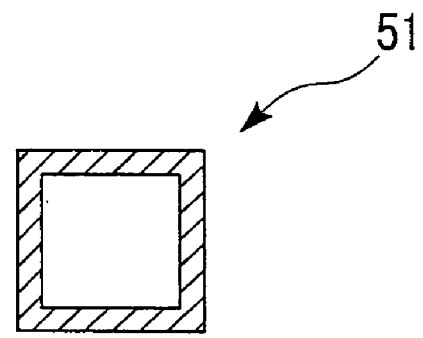
Figure 5C:
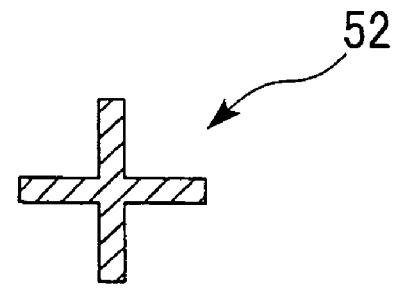

FIG. 5 shows examples of the gas flow controlling member with different transverse sections, including the gas flow controlling member 32 in a tubular shape with a circular cross section explained in the above embodiment as shown in (a) and a gas flow controlling member 51 with a square cross section as shown in (b). Further, the gas flow controlling member is formed in a narrow plate body, in addition to the tubular shape. The gas flow controlling member is formed in various shapes, for example, a gas flow controlling member 52 in which two plate bodies are assembled in a cross shape when viewed transversely, as shown in (c).

Further, in place of a heat transfer tube, a wall of the reactor is given a jacket structure into which a heating medium may be flowed. Still further, the gas introduction device, the raw material supply device and others are not limited in details of the structure to those of the above embodiment, and any structure is acceptable as long as it is able to supply metal silicon powder and hydrogen chloride gas so that they can be fluidized in the reactor.

What is claimed is:

1. A method for producing trichlorosilane comprising:
providing a reactor and a plurality of gas flow controlling members disposed along the vertical direction in an internal space of the reactor and arranged in close proximity to each other in order to suppress growth of gas bubbles and break gas bubbles into smaller bubbles;
supplying metal silicon powder as a raw material to the reactor;
introducing hydrogen chloride gas to the reactor from therebelow so that the hydrogen chloride gas flows upward along the gas flow controlling members;
fluidizing the metal silicon powder by the flow of the hydrogen chloride gas and reacting the metal silicon powder with the hydrogen chloride gas to generate trichlorosilane gas; and
taking out gas containing the trichlorosilane from an upper part of the reactor.

2. The method according to claim 1, further comprising the step of agitating the metal silicon powder and the hydrogen chloride gas after introducing hydrogen chloride gas to the reactor.

3. The method according to claim 1, further comprising providing the reactor with a large diameter portion disposed at an upper part of the reactor, having an inner diameter, to decrease a speed of an upward flow of hydrogen chloride gas and metal silicon powder.

4. The method according to claim 3, wherein an inner diameter of the large diameter portion is in a range of 1.3 to 1.6 times with respect to the inner diameter of a lower part of the reactor.

5. The method according to claim 1, further comprising providing a heat transfer tube to the reactor.

6. The method according to claim 5, wherein each of the gas flow controlling members is formed so as to be shorter than the heat transfer tube.

7. The method according to claim 6, wherein a lower end of each of the gas flow controlling members is installed to be equal in height to a lower end of the heat transfer tube.

8. The method according to claim 6, wherein an upper end of each of the gas flow controlling member is arranged below an upper end of the heat transfer tube.

9. The method according to claim 1, further comprising providing a jacket structure into which a heating medium may be flowed.

10. The method according to claim 1, wherein a supply quantity of the metal silicon powder is adjusted by controlling a flow rate of the hydrogen chloride gas.

* * * * *